United States Patent [19]

Shue

[11] 4,212,793
[45] Jul. 15, 1980

[54] MOLD CORROSION INHIBITION

[75] Inventor: Robert S. Shue, Bartlesville, Okla.

[73] Assignee: Phillips Petroleum Company, Bartlesville, Okla.

[21] Appl. No.: 972,084

[22] Filed: Dec. 21, 1978

[51] Int. Cl.² .................. C08K 5/09; C08K 3/32; C08K 3/38

[52] U.S. Cl. ............... 260/45.85 T; 428/419; 260/45.7 PH; 260/45.7 R; 260/45.85 V

[58] Field of Search .......... 260/45.85 R, 45.85 T, 260/45.85 E, 45.85 V, 45.7 R, 45.7 PH, 37 R; 428/419; 528/388; 264/300, 301, 303, 307, 304; 106/14.39

[56] References Cited

U.S. PATENT DOCUMENTS

| | | | |
|---|---|---|---|
| 2,103,581 | 12/1937 | Gray | 260/45.9 NC |
| 2,364,410 | 12/1944 | Whittaker | 260/45.85 T |
| 2,583,370 | 1/1952 | Goppel et al. | 260/45.9 AM |
| 2,654,679 | 10/1953 | Goppel et al. | 260/45.9 R |
| 2,753,321 | 7/1956 | Jankens | 260/45.85 T |
| 3,380,836 | 4/1968 | Robinson | 106/14.39 |
| 4,017,450 | 4/1977 | Bailey | 260/37 R |
| 4,039,518 | 8/1977 | Campbell | 528/388 |
| 4,071,509 | 1/1978 | Edmonds | 528/388 |
| 4,115,344 | 9/1978 | Brady | 260/37 R |
| 4,138,526 | 2/1979 | Borresen et al. | 428/419 |
| 4,145,326 | 3/1979 | Blackwell | 260/45.85 R |

OTHER PUBLICATIONS

Fikentscher-Alien Custodian Property-Published Patent Application S.N. 389,417 issued 4-20-73.

*Primary Examiner*—V. P. Hoke

[57] ABSTRACT

The tendency of poly(arylene sulfide) resin to cause mold corrosion upon molding is inhibited by admixing with said poly(arylene sulfide) resin prior to the molding thereof a suitable amount of at least one metal salt of metaboric acid, tetraboric acid, hypophosphorous acid, hypophosphoric acid, metaphosphoric acid, orthophosphoric acid, pyrophosphoric acid or an aliphatic polycarboxylic acid containing 4 to 10 carbon atoms wherein the metal is selected from Groups IA or IIA of the Periodic Table of the Elements.

13 Claims, No Drawings

MOLD CORROSION INHIBITION

This invention relates to poly(arylene sulfide) resin compositions. In another aspect this invention relates to a method for inhibiting the tendency of molten poly(arylene sulfide) resin to cause metal in contact therewith to corrode. In a further aspect, this invention relates to a method for at least substantially eliminating the tendency of poly(arylene sulfide) resin to cause corrosion of the molds employed in molding processes.

Today poly(arylene sulfide) resin engineering thermoplasics having outstanding ability to withstand high temperatures and chemical attack are commercially available. It has been observed that occasionally during the injection molding of certain poly(arylene sulfide) resins mold corrosion occurs. It is presently believed that this corrosion is due at least in part to the evolution of some sulfur dioxide by the molten poly(arylene sulfide) resin. The sulfur dioxide when combined with moisture could adversely affect many metal molds. The amount of corrosion has varied with different lots of poly(arylene sulfide), with molds of different composition, and with molding conditions. The corrosion, when observed, has varied from only a slight attack of the mold after extensive molding to very extensive damage after molding for only a short time. Molds of beryllium copper and Vega tool steel are very susceptible to such mold corrosion while molds of stainless steel, such as 303 Stainless, 304 Stainless, and 316 Stainless, and molds with chrome or nickel plating are most resistant to such corrosion. The use of stainless steel molds and chrome or nickel-plated molds can pose an economic burden upon plastic fabrications that do not already have such molds. Thus, other means of combatting the corrosion problem would be beneficial for the development of the poly(arylene sulfide) resin technology.

Accordingly, an object of the present invention is to provide a method for reducing the possibility of mold corrosion during the molding of poly(arylene sulfide) resins.

A further object is to provide a novel poly(arylene sulfide) resin molding composition.

Other objects, advantages, and features of this invention will be apparent to those skilled in the art upon reading the following description, examples, and appended claims.

In accordance with this invention the tendency of poly(arylene sulfide) resin to cause mold corrosion under molding conditions is inhibited by incorporating into said poly(arylene sulfide) resin prior to the molding thereof a corrosion inhibiting amount of at least one metal salt of metaboric acid, tetraboric acid, hypophosphorous acid, hypophosphoric acid, metaphosphoric acid, orthophosphoric acid, pyrophosphoric acid, or an aliphatic polycarboxylic acid containing 4 to 10 carbon atoms wherein the metal is selected from Groups IA and IIA of the Periodic Table of the Elements.

The Periodic Table of the Elements referred to above is given in the Handbook of Chemistry and Physics, Chemical Rubber Company, 45th Edition (1964), page B-2.

The present invention can be applied to any normally solid poly(arylene sulfide) resins, whether linear, branched, or lightly crosslinked. The invention can be used, for example, with poly(arylene sulfide) resins prepared as described in U.S. Pat. No. 2,513,188 wherein polyhalo aromatic compounds are reacted with sulfur and metal sulfide at the fusion temperature. It can also be used with resins manufactured by the method described in British Patent No. 962,941 wherein metal salts of halothiophenols are heated at a polymerizing temperature. The invention is particularly useful with polymers prepared by the solution reaction of polyhalo compounds with alkali metal sulfides as described in U.S. Pat. No. 3,354,129. If it is desired to employ poly(arylene sulfide) resins of lower melt flow than those obtained through the process of the just previously mentioned patent, the polymers obtained in that process can be modified, e.g., according to the method disclosed in U.S. Pat. No. 3,699,087 or that disclosed in U.S. Pat. No. 3,717,620. The present invention can also be used upon p-phenylene sulfide polymers prepared as described in U.S. Pat. No. 3,919,177, wherein p-phenylene sulfide polymers are produced by reacting at least one p-dihalobenzene with a mixture in which at least one suitable source of sulfur, at least one alkali metal carboxylate, and at least one organic amide are contacted. Since the techniques of producing poly(arylene sulfide) resins disclosed in the above-mentioned patents are known to those skilled in the art, further description of those processes will not be set forth herein. For more detail one may refer to the specific patents, which are incorporated herein by reference.

The present invention is particularly useful for molding grade poly(arylene sulfide) resins. Generally such poly(arylene sulfide) resins have melting points in the range of about 280° C. to about 400° C. The melt flow of such poly(arylene sulfide) resin, determined by the method of ASTM D 1238-70, modified to a temperature of 316° C. using a 5-kg weight, generally will be within the range of about 0.5 to about 250, preferably about 20 to about 50, g/10 min.

The present invention is particularly useful for the poly(arylene sulfide) resins which are linear, branched, or lightly crosslinked poly-(phenylene sulfide) resins. Molding grade poly(phenylene sulfide) resins can be molded into a variety of useful articles by molding techniques which are known in the art. Molding should be carried out generally above the melting point or softening point but below the decomposition point of the particular polymer being molded. Suitable molding techniques include injection molding, compression molding, vacuum molding, extrusion and the like. While the present invention is particularly suitable for preventing corrosion that occurs when poly(phenylene sulfide) resins are injection molded, it is considered that the invention will substantially eliminate corrosion that occurs as a result of any technique involving contacting of metal with molten poly(arylene sulfide) resins.

Specific examples of suitable metal salts include calcium metaborate, calcium, tetraborate, lithium metaborate, lithium tetraborate, magnesium metaborate, potassium tetraborate, sodium metaborate, sodium tetraborate and strontium tetraborate, barium monoorthophosphate, barium pyrophosphate, barium hypophosphite, calcium metaphosphate, calcium triorthophosphate, lithium dihydrogenorthophosphate, lithium triorthophosphate, magnesium hypophosphite, magnesium pyrophosphate, magnesium triorthophosphate, potassium monohydrogenorthophosphate, potassium triorthophosphate, potassium tetrametaphosphate, potassium hexametaphosphate, tetrasodium pyrophosphate, sodium triorthophosphate, sodium hypophosphite, strontium diorthophosphate, and cesium triorthophosphate.

Suitable salts of said aliphatic polycarboxylic acids containing 4 to 10 carbon atoms per molecule include those derived from saturated or unsaturated di- and tricarboxylic acids and from saturated, di- and tricarboxylic acids additionally substituted with 1 to 4 hydroxyl groups per molecule.

Specific examples of salts derived from the aliphatic polycarboxylic acid include sodium succinate, potassium succinate, sodium adipate, sodium suberate, potassium maleate, sodium malate, cesium tartrate, sodium potassium tartrate, calcium tartrate, dipotassium hydrogen citrate, trisodium citrate, trilithium citrate, calcium citrate, disodium saccharate and the like and mixtures. Mixtures of the salts of the polycarboxylic acids and of the salts of the mineral acids can be employed also.

The amount of salt combined with the poly(arylene sulfide) resin is any amount which is sufficient to reduce the tendency of the resin to cause mold corrosion. Generally, the salt is employed in an amount in the range of about 0.05 to about 5 parts by weight per 100 parts by weight of resin (phr) more preferably from about 0.1 to about 1 phr.

The salt can be incorporated in the poly(arylene sulfide) resin by any suitable technique which results in a composition comprising poly(arylene sulfide) resin and a suitable amount of said metal salt. Preferably the metal salt and the resin are admixed in such a manner as to obtain a substantially uniform distribution of the salt in the resin. The mixing temperature can range from about room temperature, e.g. 20° C., to about 50° C. above the melting point of the resin.

Like other poly(arylene sulfide) resin compositions, the resin compositions of this invention have utility in uses where high melting point and high temperature stability are desirable. The poly(arylene sulfide) resins of this invention can also include other additives such as fillers, pigments, stabilizers, softeners, extenders, and other polymers. In injection molding, for example, it is quite common to prepare poly(arylene sulfide) resin composition containing about 20 to about 50 weight percent of conventional glass fiber filler, based on the weight of the poly(arylene sulfide) resin and the glass fiber filler. Generally glass fibers about ¼ inch to about 2 inches in length are employed. Also, as known in the art, such glass-filled compositions can be prepared by feeding continuous glass roving through an extruder along with the thermoplastic. Of course, it would be counterproductive to employ an additive which increases the corrosion tendency of the present inventive composition.

The present invention and its advantages will now be determined.

It has been found difficult to find lab-scale tests which correlate consistently well with mold corrosion experienced during injection molding of poly(phenylene sulfide), abbreviated PPS for convenience, a presently preferred arylene sulfide resin for molding. This suggests several mechanisms causing corrosion may be present. However, three lab tests have been developed which can be usefully employed to determine whether or not a given lot of PPS will probably cause mold corrosion. The tests are described as follows: (1) acidity test: The PPS sample in powder form is charged to a glass tube 20 cm long and 10 min. O.D. which is closed off at the bottom, open at the top and which has a restriction about 7.5 cm from the tube bottom narrowing the O.D. in that area to about ½ that of the remainder of the tube. Sufficient PPS is charged to give a depth of about 4 cm. The charged tube is stoppered with a cork stopper, placed in a heated block maintained at a nominal temperature of 350° C. and allowed to equilibrate for 5 minutes. At that time a moist piece of alkacid paper (pH paper) about 1 cm long is dropped into the opened tube allowing it to fall to the restriction and the tube is restoppered. Color changes that occur in the test paper are noted after 30 seconds and at intervals thereafter until terminating the test when 30 minutes has elapsed. Acidic readings at any time of the test indicate the presence of gases that are potential sources of mold corrosion. (2) Copper mirror test: The glass tube, method of heating, and sample charging, are as described in the acidity test except that the test temperature employed is 200° C. After charging the tube a commercially obtained copper mirror about 2.5 cm long and just wide enough to slide into the glass tube is inserted and allowed to fall down to just above the restricted portion. The copper mirror consists of a vacuum-deposited film of copper metal (having a thickness equivalent to 10±5% transmission of normal incident light of 5000 angstroms) on a sheet of clear, transparent, polished glass. The mirrors can be obtained from Evaporated Metal Films Corp., Ithaca, N.Y. After insertion of the mirror, the tube is stoppered, placed in the heating block and remains there for the duration of the test, e.g. up to about 24 hours or longer, if necessary. The mirror is periodically removed and visually examined by placing it against a white background using a standard light source as per ASTM D 1729. A failure time in hours is noted when complete removal of the copper film in any part of the mirror occurs as shown by the white background showing through. (3) Sulfur dioxide test: A 50 mg sample of the PPS powder is inserted into a glass tube similar to that previously described having a sealed end. The other end can be connected to a gas chromatography device by a valving arrangement. The tube is heated to 350° C., held for 15 minutes and the gases are passed to the analyzer. The results are expressed in terms of grams $SO_2$ evolved per gram PPS. The greater the $SO_2$ evolution the greater the propensity for mold corrosion.

EXAMPLE

Blends of polyphenylene sulfide (PPS) with the specified salt inhibitors are prepared by individually mixing 25 g portions of PPS (Ryton[R] P4) with a specified amount of the salt in a Wiring Blender at room temperature. The resulting blends, and controls, after recovery were individually tested according to the methods previously described. The results are presented in the following table.

TABLE

PPS - SALT BLENDS

| | Inhibitor Salt | | Tests | | | |
|---|---|---|---|---|---|---|
| Run No. | Name | Level (phr)[a] | $SO_2$ Wt. % | Copper Mirror hours | Acidity Rating (after 30 min.) | Remarks |
| 1 | calcium hypophosphite | 0.2 | 0.344 | 4–5 | moderately strong | Invention |
| 1A | calcium hypophosphate | 1.0 | .312 | 6–22[c] | strong | Invention |

TABLE-continued

PPS - SALT BLENDS

| Run No. | Inhibitor Salt Name | Level (phr)[a] | Tests SO$_2$ Wt. % | Copper Mirror hours | Acidity Rating (after 30 min.) | Remarks |
|---|---|---|---|---|---|---|
| 2 | magnesium sulfate | 0.2 | .279 | 2-3 | neutral | Control |
| 2A | magnesium sulfate | 1.0 | .296 | 2-3 | strong | Control |
| 3 | sodium tetraborate | 0.2 | .154 | 6-7 | strong | Invention |
| 3A | sodium tetraborate | 1.0 | .132 | 4-19 | strong | Invention |
| 4 | trisodium citrate | 0.2 | .149 | 5-6 | basic | Invention |
| 4A | trisodium citrate | 1.0 | <.01 | 5-6 | basic | Invention |
| 5 | trisodium phosphate | 0.2 | .184 | 4-19[c] | moderately strong | Invention |
| 5A | trisodium phosphate | 1.0 | .05[b] | 4-19[c] | neutral | Invention |
| 6 | tetrasodium pyrophosphate | 0.2 | .176 | 3-4 | strong | Invention |
| 6A | tetrasodium pyrophsophate | 1.0 | .094 | 3-4 | strong | Invention |
| 7 | none | 0 | .241 | 2-3 | strong | Control |

[a] phr is parts by weight inhibitor per 100 parts by weight resin.
[b] average of 6 runs, ranging from 0.0001 to 0.114
[c] range indicates the sample failed sometime in this time span. That is failure occurred sometime between quitting time for the day and resumption of work the following morning.

The results given in control runs 7 (no inhibitor) and, 2 and 2A (a salt out of the scope of the invention) indicate the baseline for comparison with the remaining invention runs. Thus, the SO$_2$ evolved from the control compositions is about 0.24 wt. % or higher, the copper mirror is degraded in 2-3 hours and the acidity rating after 30 minutes is described as strong. Invention run samples generally perform better than the control run samples in at least two of the three tests or substantially better in at least one test. For example, in invention run 1A, although the SO$_2$ evolution exceeds that of control run 7, the value for the copper mirror test is at least double that of the control.

The foregoing description and example have been provided to enable those skilled in the art to understand the present invention and its preferred embodiments. Obvious variations of the invention claimed below are considered to be within the scope of the claimed invention.

What is claimed is:

1. A composition of matter comprising poly(arylene sulfide) resin having incorporated therein a corrosion inhibiting amount of a corrosion inhibiting agent consisting essentially of at least one metal salt selected from the group consisting of calcium hypophosphite, sodium tetraborate, trisodium citrate, trisodium phosphate, and tetrasodium pyrophosphate.

2. A composition of matter according to claim 1 wherein said salt is employed in an amount in the range of about 0.05 to about 5 parts by weight per 100 parts by weight of the poly(arylene sulfide) resin.

3. A composition of matter according to claim 1 wherein said salt is employed in an amount in the range of about 0.1 to about 1 part by weight per 100 parts by weight of the poly(arylene sulfide) resin.

4. A composition of matter according to claim 3 wherein said poly(arylene sulfide) resin is a poly(phenylene sulfide) resin having a melting point in the range of about 280° C. to about 400° C. and wherein said at least one metal salt is selected from the group consisting of calcium hypophosphite, trisodium citrate, and trisodium phosphate.

5. A method for forming shaped products of normally solid poly(arylene sulfide) resin comprising (1) forming a poly(arylene sulfide) resin composition comprising poly(arylene sulfide) resin having incorporated therein a corrosion inhibiting amount of a corrosion inhibiting agent consisting essentially of at least one metal salt selected from the group consisting of calcium hypophosphite, sodium tetraborate, trisodium citrate, trisodium phosphate, and tetrasodium pyrophosphate, and (2) molding said poly(arylene sulfide) resin composition.

6. A method according to claim 5 wherein said salt is employed in an amount in the range of about 0.05 to about 5 parts by weight per 100 parts by weight of the poly(arylene sulfide) resin.

7. A method according to claim 5 wherein said salt is employed in an amount in the range of about 0.1 to about 1 part by weight per 100 parts by weight of the poly(arylene sulfide) resin.

8. A method according to claim 7 wherein said poly(arylene sulfide) resin is a poly(phenylene sulfide) resin having a melting point in the range of about 280° C. to about 400° C.

9. A method according to claim 8 wherein said molding is carried out at a temperature in the range of about 280° C. to about 400° C.

10. A method for improving a poly(arylene sulfide) resin composition so that it will be less likely to cause metal to corrode as a result of having been in contact with molten poly(arylene sulfide) resin of said composition, said method comprising incorporating into said poly(arylene sulfide) resin a corrosion inhibiting amount a corrosion inhibiting agent consisting essentially of at least one metal salt selected from the group consisting of calcium hypophosphite, sodium tetraborate, trisodium phosphate, and tetrasodium pyrophosphate.

11. A method according to claim 10 wherein said salt is employed in an amount in the range of about 0.05 to about 15 parts by weight per 100 parts by weight of the poly(arylene sulfide) resin.

12. A method according to claim 10 wherein said salt is employed in an amount in the range of about 0.1 to about 1 part by weight per 100 parts by weight of the poly(arylene sulfide) resin.

13. A method according to claim 12 wherein said poly(arylene sulfide) resin is a poly(phenylene sulfide) resin having a melting point in the range of about 280° C. to about 400° C.

* * * * *